United States Patent
Tian et al.

(10) Patent No.: US 9,514,520 B2
(45) Date of Patent: *Dec. 6, 2016

(54) METHOD AND APPARATUS FOR IMAGE FILTERING

(71) Applicant: AT&T INTELLECTUAL PROPERTY I, LP, Atlanta, GA (US)

(72) Inventors: Chao Tian, Madison, NJ (US); Shankar Krishnan, Chatham, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,926

(22) Filed: Jul. 10, 2015

(65) Prior Publication Data

US 2015/0324960 A1    Nov. 12, 2015

Related U.S. Application Data

(63) Continuation of application No. 14/031,188, filed on Sep. 19, 2013, now Pat. No. 9,111,336.

(51) Int. Cl.
*G06K 9/40* (2006.01)
*G06T 5/00* (2006.01)
*G06T 5/20* (2006.01)

(52) U.S. Cl.
CPC ............ *G06T 5/002* (2013.01); *G06T 5/20* (2013.01); *G06T 2207/20012* (2013.01); *G06T 2207/20028* (2013.01)

(58) Field of Classification Search
None
See application file for complete search history.

(56) References Cited

U.S. PATENT DOCUMENTS

| | | | |
|---|---|---|---|
| 5,612,751 A * | 3/1997 | Kondo | H04N 19/51 348/699 |
| 8,081,839 B2 | 12/2011 | Hasegawa | |
| 8,164,594 B2 | 4/2012 | Watanabe et al. | |
| 8,315,473 B1 | 11/2012 | Tao et al. | |
| 8,494,060 B2 | 7/2013 | Park et al. | |
| 2007/0286519 A1 | 12/2007 | Friedrich | |
| 2009/0225842 A1 | 9/2009 | Cheon et al. | |
| 2010/0135389 A1 | 6/2010 | Tanizawa et al. | |
| 2010/0310156 A1 | 12/2010 | De Haan et al. | |

(Continued)

OTHER PUBLICATIONS

Paris, et al., "Bilateral Filtering: Theory and Applications", Foundations and Trends in Computer Graphics and Vision; vol. 4, No. 1 (2008) pp. 1-73. [Note: this reference published before the application Sep. 2013].

(Continued)

*Primary Examiner* — Eueng-Nan Yeh
(74) *Attorney, Agent, or Firm* — Guntin & Gust, PLC; Robert Gingher

(57) ABSTRACT

A system that incorporates the subject disclosure may include, for example, partitioning the image into a group of blocks, calculating principle bilateral filtered image components for a first subset of the group of blocks where the principle bilateral filtered image components are not calculated for a second subset of the group of blocks, and applying an infinite impulse response filter to the image using the principle bilateral filtered image components. Other embodiments are disclosed.

19 Claims, 6 Drawing Sheets

(56) References Cited

U.S. PATENT DOCUMENTS

| | | |
|---|---|---|
| 2012/0182388 A1 | 7/2012 | Lim et al. |
| 2012/0200669 A1 | 8/2012 | Lai et al. |
| 2012/0250998 A1 | 10/2012 | Mitsunaga |
| 2013/0028322 A1 | 1/2013 | Fujibayashi et al. |
| 2013/0044809 A1 | 2/2013 | Chong et al. |
| 2013/0071024 A1 | 3/2013 | Jang et al. |
| 2013/0108186 A1 | 5/2013 | Zhu et al. |
| 2014/0198977 A1 | 7/2014 | Narasimha et al. |

OTHER PUBLICATIONS

Yang, Qingxiong et al., "Real-Time O(1) Bilateral Filtering", http://vision.ai.uiuc.edu/~qyang6/, Jun. 2009.

Yu, Wei, "Fast Bilateral Filtering by Adapting Block Size", Proceeding of 2010 IEEE 17th International Conference on Image Processing, Sep. 26-29, 2010, Hong Kong.

Zhai, Guangtao et al., "Image Error-Concealment via Block-based Bilateral Filtering", IEEE, 2008, (published before this application Sep. 2013).

* cited by examiner

METHOD AND APPARATUS FOR IMAGE FILTERING

CROSS-REFERENCE TO RELATED APPLICATIONS

This application is a Continuation of and claims priority to U.S. patent application Ser. No. 14/031,188 filed Sep. 19, 2013, the disclosure of which is hereby incorporated by reference into this application as if set forth herein in full.

FIELD OF THE DISCLOSURE

The subject disclosure relates to a method and apparatus for image filtering.

BACKGROUND

Media services that include transmitting images are in high demand. Consumers desire quality images but also desire little delay in receiving the images. To meet these demands, filtering methods have been implemented. These filtering methods can require a large amount of computational resources to achieve a desired level of filtering accuracy.

BRIEF DESCRIPTION OF THE DRAWINGS

Reference will now be made to the accompanying drawings, which are not necessarily drawn to scale, and wherein.

DETAILED DESCRIPTION

Figure 1:
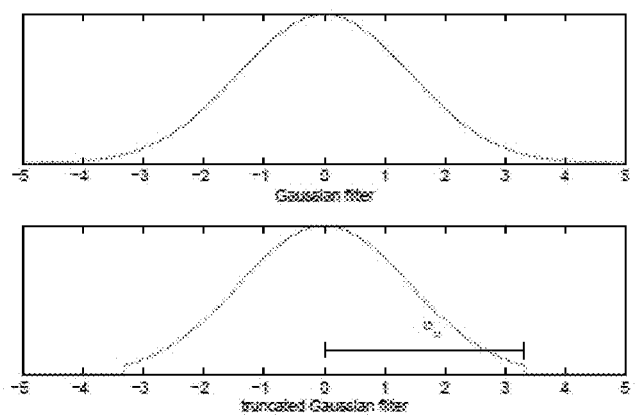
FIG. 1 depicts an illustrative embodiment of a Gaussian filter and its truncated version.

The subject disclosure describes, among other things, illustrative embodiments of image filtering. One or more of the exemplary embodiments utilize bilateral filtering that is selectively applied to blocks of an image to perform image filtering. For example, Yang's realtime O(1) bilateral filtering algorithm (see Q. Yang, K.-H. Tan, and N. Ahuja, "Real-time O(1) bilateral filtering," in Proc. CVPR '09, pp. 557-564, 2009, the disclosure of which is hereby incorporated herein by reference in its entirety) can be accelerated or otherwise facilitated based on strategically eliminating some of the computation. To identify computation for elimination from the algorithm, the algorithm steps can be analyzed in conjunction with its recursive Gaussian filtering component. By block partitioning the image, the procedure to isolate the computation steps to be eliminated is simplified, and the modified algorithm skips some of the image blocks when performing recursive linear filtering. In one or more embodiments, the resultant accelerated algorithm is able to achieve 1.5 to 5 times speedup, depending on the image statistics and the filtering parameters. The exemplary embodiment may marginally degrade the accuracy of the filtering, but the simplicity and small memory footprint of Yang's original algorithm are largely maintained. Other embodiments are included in the subject disclosure.

One embodiment of the subject disclosure is a method that includes accessing an image and partitioning the image into a group of blocks including first blocks, first surrounding blocks that are each adjacent to one of the first blocks, second blocks, and second surrounding blocks that are each adjacent to one of the second blocks. The method can include calculating principle bilateral filtered image components for the first blocks responsive to determinations that a first pixel within each of the first blocks has a first intensity level within a pre-determined intensity range or responsive to a determination that a second pixel within the first surrounding blocks has a second intensity level within the pre-determined intensity range. The principle bilateral filtered image components are not calculated for the second blocks responsive to a determination that pixels within the second blocks have intensity levels outside of the pre-determined intensity range and responsive to a determination that pixels within the second surrounding blocks have intensity levels outside of the pre-determined intensity range. The method can include applying an infinite impulse response filter to the image using the principle bilateral filtered image components.

One embodiment of the subject disclosure includes a computer-readable storage device comprising computer instructions which, responsive to being executed by a processor, cause the processor to perform operations comprising accessing an image and partitioning the image into a group of blocks. The processor can calculate principle bilateral filtered image components for a first subset of the group of blocks, where the principle bilateral filtered image components are not calculated for a second subset of the group of blocks. The processor can apply an infinite impulse response filter to the image using the principle bilateral filtered image components.

One embodiment of the subject disclosure includes a device having a memory to store computer instructions, and a processor coupled with the memory. The processor, responsive to executing the computer instructions, can perform operations including accessing an image and partitioning the image into a group of blocks. The processor can calculate principle bilateral filtered image components for a first subset of the group of blocks, where the principle bilateral filtered image components are not calculated for a second subset of the group of blocks. The processor can apply an infinite impulse response filter to the image using the principle bilateral filtered image components.

One or more of the exemplary embodiments can utilize a form of bilateral filtering as an edge preserving smoothing filter. Unlike a Gaussian filter which smoothes the image in a spatially invariant manner, the bilateral filter has a factor which can control the smoothing using the intensity (color) domain information. This added control can enable the bilateral filtering to effectively preserve the strong edges while smoothing away the undesirable noises, leading to many applications such as image de-noising, tone mapping, flash/no-flash fusion and/or stereo matching. The benefit of edge preserving smoothing via the exemplary embodiments is not without its computational cost. The bilateral filter is essentially a non-linear filter, and can be computationally expensive.

Among the fastest existing bilateral filtering algorithms is Yang's real-time O(1) bilateral filtering algorithm, where O(1) refers to a constant factor of computation per image pixel. This algorithm generates the filtered image by first computing the Principle Bilateral Filtered Image Component (PBFIC) through recursively linearly filtering two intermediate images, then linearly interpolating between two adjacent PBFICs. The main step in computing the PBFICs is spatial invariant linear filtering, which is understood and less expensive computationally than non-linear filtering. This algorithm is able to produce very accurate bilateral filtered result with a small memory footprint. In the exemplary embodiments, Yang's algorithm can be enhanced, based on the observation that in Yang's original algorithm some of the computations for the PBFICs are wasteful. To reduce such wasteful computations, the computation steps are analyzed in conjunction with the recursive Gaussian filtering procedure to isolate them, and skip some of the image blocks to avoid a large portion of such computation. The resultant process of the exemplary embodiments is able to achieve at least 1.5 to 5 times speed up, depending on the image statistics and the filtering parameters.

Mathematically, the bilateral filtering operation performs the following computation for each pixel x in an image:

$$I^B(\vec{x}) = \frac{\sum_{\vec{y} \in N(\vec{x})} f_S(\vec{x}, \vec{y}) \cdot f_R(I(\vec{x}), I(\vec{y})) \cdot I(\vec{y})}{\sum_{\vec{y} \in N(\vec{x})} f_S(\vec{x}, \vec{y}) \cdot f_R(I(\vec{x}), I(\vec{y}))}, \quad (1)$$

where I(x) is the intensity value at pixel location x, N(x) is a specific neighborhood of x, $f_S(x, y)$ is the spatial filtering kernel depending only on the pixel locations x and y, and $f_R(I(x), I(y))$ is the range filtering kernel depending only on the intensity I(x) and I(y). The original bilateral filtering uses Gaussian-like filter of different variances for the spatial filtering kernel $f_S(x, y)$ and range filtering kernel $f_R(I(x), I(y))$, $$f_S(\vec{x}, \vec{y}) = \exp(-\|\vec{x} - \vec{y}\|^2 / 2\sigma_S^2), \quad (2)$$

$$f_R(I(\vec{x}), I(\vec{y})) = \exp(-(I(\vec{x}) - I(\vec{y}))^2 / 2\sigma_R^2), \quad (3)$$

where $\sigma_S$ and $\sigma_R$ are the spatial kernel variance and the range kernel variance, respectively. The kernel functions $f_S(x, y)$ and $f_R(I(x), I(y))$ have since been generalized to other filters, e.g., to the box-filter spatial kernel.

Yang's real-time O(1) bilateral filtering algorithm can be described as follows. For a digital image, there are only a finite number of possible intensity values, i.e., $I(x) \in \{0, 1, \ldots, N-1\}$. For each intensity value, $k \in \{0, 1, \ldots, N-1\}$ in a given image, the following two quantities are only functions of the pixel location y $$W_k(\vec{y}) \triangleq f_R(k, I(\vec{y})), \, J_k(\vec{y}) \triangleq W_k(\vec{y}) \cdot I(\vec{y}). \quad (4)$$

Now (1) can be written as $$I^B(\vec{x}) = I_{I(\vec{x})}^B(\vec{x}), \quad (5)$$

where by denoting I(x)=k $$I_k^B(\vec{x}) \triangleq \frac{J_k'(\vec{x})}{W_k'(\vec{x})} = \frac{\sum_{\vec{y} \in N(\vec{x})} f_S(\vec{x}, \vec{y}) \cdot J_k(\vec{y})}{\sum_{\vec{y} \in N(\vec{x})} f_S(\vec{x}, \vec{y}) \cdot W_k(\vec{y})}. \quad (6)$$

Both the numerator and the denominator in (6) are spatial-invariant linear Gaussian filtering, which can be computed efficiently using a recursive method such as described in R. Deriche, "Fast algorithms for low-level vision," IEEE Trans. PAMI, vol. 12, no. 1, pp. 78-87, 1990 and R. Deriche, "Recursively implementing the Gaussian and its derivatives," Tech. Rep. 1893 INRIA, Unit de Recherche Sophia-Antipolis, 1993, the disclosures of which are hereby incorporated by reference in their entirety.

This gives the bilateral filtered value for pixels of intensity k. By sweeping through all possible intensities, the bilateral filtered value for each pixel can be determined. Each of these $I^B_k(x)$ images is called a Principle Bilateral Filtered Image Component (PBFIC). Yang's real-time O(1) bilateral filtering algorithm is built on the observation that there is no need to compute PBFIC for all the intensity levels, but instead only PBFICs for K<N levels (denoted as $\{L_0, L_1, \ldots, L_{K-1}\}$ where $L_0$ and $L_{K-1}$ are the lower and upper limits of the dynamic range, respectively) need to be computed; for notational simplicity, they can be written as $PBFIC(L_0), PBFIC(L_1), \ldots, PBFIC(L_{K-1})$. The final bilateral filtered value $I^B(x)$ at location x can then be linearly interpolated using the values at location x of $PBFIC(L_{i-1})$ and $PBFIC(L_i)$ for any pixel x such that $I(x) \in (L_{i-1}, L_i)$, i.e., using the linear combination of them with respective weights:

$$\frac{L_i - I(\vec{x})}{L_i - L_{i-1}} \quad \frac{I(\vec{x}) - L_{i-1}}{L_i - L_{i-1}}$$

An advantage of this algorithm is its small memory footprint, because one could sweep through $\{L_0, L_1, \ldots, L_{K-1}\}$, and only two adjacent PBFICs need to be kept such that for any pixels whose intensities fall into this range, their filtered values can be correctly obtained. Since the Gaussian filter is separable, the overall process can be decomposed into horizontal and vertical filtering. The one dimensional recursive algorithm of Deriche (referenced above) includes a forward pass and a backward pass, each one of which is a linear filtering using an infinite impulse response (IIR) filter, and the combination of these two passes leads to an accurate approximation of the Gaussian smoothing.

Figure 2:
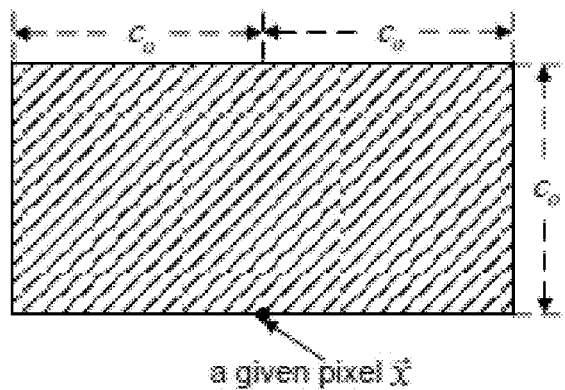
FIG. 2 depicts an illustrative embodiment of a coherent region for a forward vertical pass during bilateral filtering.

As an example, consider the case where the image pixel intensity values are all in the range of $(L_0, L_1)$. When Yang's algorithm is used on this image, since the filtered result $I^B(x)$ at each pixel is completely determined by $PBFIC(L_0)$ and $PBFIC(L_1)$, the other PBFICs are useless, and thus computing them is unnecessary and wasteful. This simple observation is the main motivation for the improvement proposed in this work. This extreme case example may leave the impression that for a given pixel x, we only need to compute the two levels of PBFICs at those locations x where I(x) is sandwiched in between. This is however not the case when the recursive filtering method is used. For simplicity, let us consider the one-dimensional case, and assume the IIR filter is given as $$y[n] = a_0 x[n] + a_1 x[n-1] + b_1 y[n-1] - b_2 y[n-2], \quad (7)$$

where x[n] is the input at location n, and y[n] is the filtered output at location n. Because the recursive IIR filter relies on the (previously computed) causal filtering result when computing the current output, in order to compute $y[n_0]$, all y[m]'s for $m<n_0$ essentially need to be computed. This suggests that as long as a single pixel in the image has an intensity in the range $[L_{i-1}, L_i]$, then the whole image-sized PBFIC($L_i$) and PBFIC($L_{i-1}$) (or at least some "causal portion" of them) will need to be computed. This may not lead to significant savings in computation. Note however that since the Gaussian filter has a rather short (fast decaying) tail, it can be truncated aggressively in practice as shown in FIG. 1. When the Gaussian filtering is computed using the recursive method, this is equivalent to saying that faraway signals can be ignored completely. More precisely, when computing the filtered output of (7) at location $n_o$ using a truncated version of the signal x[n], i.e., using x'[n]=0 for $n<n_o-c$, and x'[n]=x[n] for $n>=n_o-c$, the difference from the true filtered value using x[n] is very small when c is sufficiently large. In practice, a moderate value of c is usually sufficient and can be denoted as $c_o$ and called the coherent width. The precise choice of $c_o$ can be application dependent. With the coherent width $c_o$ fixed, the previous mentioned difficulty is alleviated. To compute $y[n_0]$ within a small error, only additional y[m]'s for $m=n_0-c_o$, $n_0-c_{o+1}, \ldots, n_{0-1}$ need to be computed. For two-dimensional filtering on an image, the concept of the coherent length can be generalized to the concept of the coherent region. For example, for the forward vertical filter pass, the coherent region is illustrated in FIG. 2. Combining it with the coherent region of the backward vertical filter pass, as well as the forward and backward horizontal filter passes, the overall coherent region is a square neighborhood of size $(2c_o+1)\times(2c_o+1)$ with the pixel at the center. This implies if the intensity value of a pixel $x_o$ is sandwiched between two levels $L_i$ and $L_{i+1}$, then we only need to compute $J'_{Li}(x)$, $W'_{Li}(x)$, $J'_{Li+1}(x)$ and $W'_{Li+1}(x)$ for x in a square neighborhood of size $(2c_o+1)\times(2c_o+1)$ with $x_o$ at the center. Note that we could potentially distinguish the different coherent regions for the four filter passes, but this may complicate the algorithm.

Following the above discussion, we could generate computation maps for a given image for the specified levels $L_0$, $L_1, \ldots, L_{K-1}$ using a morphological dilation operation, and avoid all unnecessary computations following these maps. This naive approach may be counter-productive since directly computing such maps is relatively (to Yang's original algorithm) expensive, defeating the purpose of accelerating the algorithm. However, the exemplary embodiments can provide an approach to approximate such maps.

The first simplification is to partition the image into blocks of size $c_o \times c_o$, and thus instead of considering whether PBFIC($L_k$) needs to be computed for a given pixel in the image, we consider whether it needs to be computed for a given block B(p, q), where p and q are its horizontal and vertical indices. Following the discussion above, it is clear that PBFIC($L_i$) should be computed for block B(p, q) if
there exists a pixel, whose intensity value is in the range $(L_{i-1}, L_{i+1})$, in B(p, q), or
there exists a pixel, whose intensity value is in the range $(L_{i-1}, L_{i+1})$, in the eight neighboring blocks of B(p, q).

Figure 3:
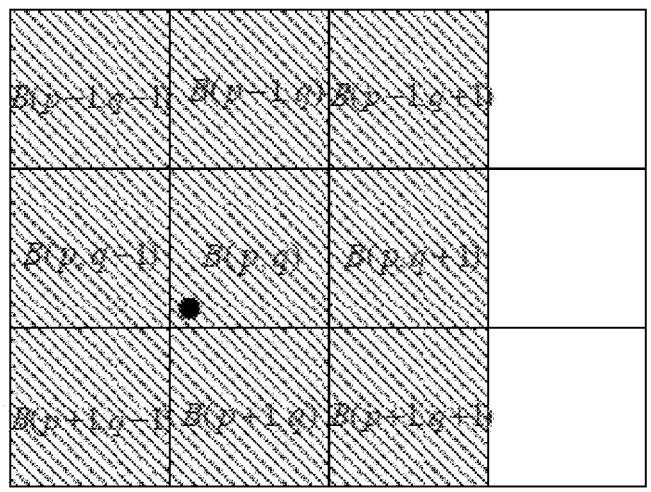
FIG. 3 depicts an illustrative embodiment of a portion of an image that has been partitioned into blocks where a pixel (the black dot) has an intensity in the range ($L_{i-1}$, $L_{i+1}$), and where the PBFIC($L_i$) can be computed for all the shaded area covering nine blocks.

The first case is necessary because of the filter computation for that particular pixel, and the second case is because the pixel in B(p, q) may be in the coherent region of a certain pixel of interest in the neighboring blocks, as illustrated in FIG. 3. In a given image block B(p, q), the maximum pixel intensity value and the minimum pixel intensity value can be denoted as max(p, q) and min(p, q), respectively. To determine whether there exists a pixel in B(p, q) in the range $(L_{i-1}, L_{i+1})$ such that PBFIC($L_i$) needs to be computed for this block, a simplification can be made to assume there is such a pixel unless:

$$L_{i-1} \geq \max(p,q) \text{ or } L_{i+1} < \min(p,q), \quad (8)$$

That is, an assumption can be made that the pixels in block B(p, q) take up all the intensity values between max(p, q) and min(p, q). Although this is in general may not always be true, it does not make significant difference in practice, and leads to a simpler algorithm.

One or more of the exemplary embodiments can have a pre-filtering stage to find the maximum and minimum values of a block, moreover to find for each block the maximum and minimum values in the region consisting of its own and its neighboring blocks. For example, the pre-filtering Step:
1) For each block B(p, q), find max(p, q) and min(p, q);
2) For each block B(p, q), find max'(p, q) and min'(p, q) where $$\max'(p, q) \triangleq \max_{|i-p|\leq 1, |j-q|\leq 1} \max(i, j)$$

$$\min'(p, q) \triangleq \min_{|i-p|\leq 1, |j-q|\leq 1} \min(i, j).$$

For simplicity, we have implicitly assumed above that (i, j) is only enumerated for blocks that exists in the image. The other part of the process can utilize portions of Yang's original algorithm, except when performing the recursive filtering. To be more precise, consider the horizontal forward filtering pass to compute $J'_{Li}(x)$ for a given row, which lies within the row of blocks B(p, 1), B(p, 2), ..., B(p, m); recall the block is of size $c_o \times c_o$, then Horizontal Pass for a Row of pixels: For q=1, 2, . . . , m
1) If $L_{i-1}<\max'(p,q)$ and $L_{i+1} \geq \min'(p,q)$
   a). If B(p,q−1) was not filtered, initialize the IIR filter;
   b): Filter the row segment within the block B(p,q) using the IIR filter;

The precise initialization settings can be found in the Deriche references describes above, but of importance is the fact that it only depends on the pixels intensity at the boundary of the current block. Note that the block B(p, −1) clearly does not exist, and thus in the above algorithm it would be considered as not filtered. The above row filtering procedure is done on each row of the image $J_{Li}$ and $W_{Li}$. The other three passes are done similarly, which eventually give $J'_{Li}$ and $W'_{Li}$, and subsequently PBFIC($L_i$).

Another benefit of using the block structure is in updating the resultant filtered image $I^B(x)$. In the original algorithm, when PBFIC($L_i$) and PBFIC($L_{i+1}$) have been computed, the image is then scanned for any pixel whose intensity falls between these two levels, and the filtered values are updated for these locations using linear interpolation. However, since we have recorded max(p, q) and min(p, q), if max(p, q)<$L_i$ or min(p, q)≥$L_{i+1}$, there is no need to search for such pixels within B(p, q). This provides some noticeable but less significant speedup, because the most expensive computation is in computing PBFICs, but not in these updating steps.

Example

Figure 4:
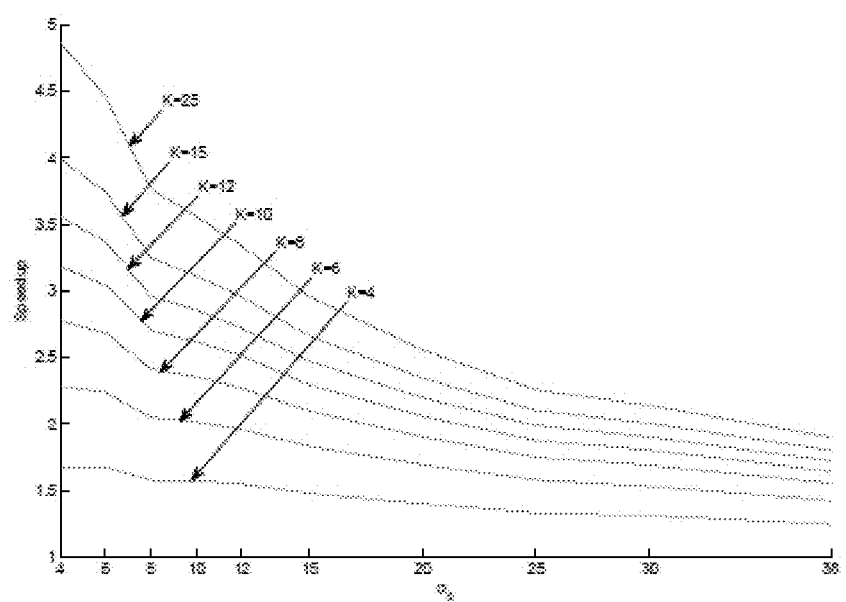
FIG. 4 depicts processing speed improvements according to the exemplary embodiments.

We evaluated the performance of the proposed process using a single-thread C/C++ implementation. The computer used had 2 G memory and a 3.33 GHz Intel i7-980X processor on Windows 7 platform. The implementation utilized the OpenCV library, and to eliminate any unfair advantage we implemented Yang's original algorithm using this library. The parameters $\sigma_S$ and $\sigma_R$ are application dependent, however, they can be selected in the range 4 to 40 and 0.04 to 0.3, respectively, as an example. The higher the number of levels K, the better the filtering accuracy at the cost of more computation; it can be sufficient to use K in 4 to 25 range when the dynamic range is 0 to 255 depending on the accuracy requirement of the applications (usually 40 dB is considered sufficient). Empirically, we found that choosing $c_o = \sigma_S$ offers a good tradeoff between accuracy and efficiency for the typical range of $\sigma_S$ and $\sigma_R$ given above, and it is used for the example; for large $\sigma_S$ values, the advantage of the proposed technique diminishes (see FIG. 4), and by setting $c_o$ larger, the exemplary process reduces to the efficiencies of Yang's original algorithm.

In this example, thirty randomly chosen images (from the Internet) were used, the content of which included people, natural sceneries, buildings, plants and animals; where the images had sizes in the range 0.5 to 6 million pixels. The naïve implementation of the bilateral filtering was used to compute the ground-truth. We first compared the accuracy of the exemplary process and the reference algorithm (each to the ground-truth). The measure used is the relative difference in peak signal-to-noise ratio (PSNR) defined as:

$$\text{rd-}PSNR = \frac{PSNR_{ref}(K, \sigma_S, \sigma_R) - PSNR_{pro}(K, \sigma_S, \sigma_R)}{PSNR_{ref}(K, \sigma_S, \sigma_R)}.$$

where $PSNR_{Rref}(K, \sigma_S, \sigma_R)$ and $PSNR_{Rpro}(K, \sigma_S, \sigma_R)$ are the PSNRs of the filtered results by the reference algorithm and that by the exemplary process, respectively, with parameters $(K, \sigma_S, \sigma_R)$ for a given image. The parameters $\sigma_S$ is sampled as in FIG. 4, $\sigma_R$ is sampled at (0.04, 0.06, 0.08, 0.1, 0.12, 0.15, 0.18, 0.25, 0.3), and K is sampled at (4, 6, 8, 10, 12, 15, 25). The average (over the test images and the sampled parameters) rd-PSNR is 0.0115 and the variance is $5.97 \times 10^{-4}$. The inaccuracy increases as $\sigma_R$ and $\sigma_S$ increase, with its dependence on $\sigma_S$ being more prominent; the rd-PSNR is almost 3% at large $\sigma_R$ and $\sigma_S$ when averaged over the test images, while being less than 1% at the other extreme. We deem this kind of accuracy degradation acceptable because at the targeted quality (PSNR 40-55 dB), less than 1 dB difference is usually negligible for typical applications of the bilateral filter. One can improve the accuracy by choosing a more conservative $c_o$ at the cost of a reduced speedup. Next we consider the speedup of the proposed method. From the structure of the method, it is clear that the speedup does not depend on the parameter $\sigma_R$ critically, and thus we plot the average speedup (over the test images and $\sigma_R$) vs $\sigma_S$ for fixed K values in FIG. 4. It can be seen that the smaller the value $\sigma_S$, the more effective the proposed method is. This is because $c_o = \sigma_S$ and smaller $c_o$ allows the method to eliminate the unnecessary computations more effectively. The method is also more effective for larger values of K because this usually implies a larger proportion of the PBFIC computations in the original algorithm are unnecessary, which provides the proposed method a larger target to reduce. As an example, on a typical 1.5 mega-pixel image, the exemplary process is able to complete in 383 ms with parameters $\sigma_R = 0.06$ and $\sigma_S = 15$, while Yang's original algorithm completes in 835 ms with 45 dB accuracy.

One or more of the exemplary embodiments can accelerate Yang's bilateral filtering algorithm by eliminating unnecessary computations through block-skipping IIR filtering. The modified process can achieve speedup of 1.5 to 5 times. Although only Gaussian kernels are described herein, the example methods can be applied to other IIR spatial filtering kernels with a short tail (e.g., the box filter). Further, downsampling of the image can also be utilized to further speed up the process. The example method can also be used in a GPU-based implementation, to achieve a speed up in the range of 1.1 to 1.3 in a CUDA-based implementation. To take advantage of the parallelism in the GPU, we choose $c_o$ to be a multiple of 16 or 32.

Figure 5:
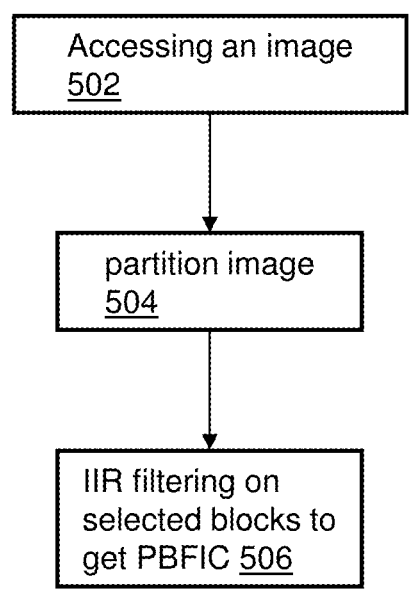
FIG. 5 depicts an illustrative method for performing image filtering based on partitioning of an image.

FIG. 5 depicts an illustrative method 500 for performing image filtering. Method 500 enables a more computationally efficient bilateral filtering process, such as based on adjustments to Yang's real-time bilateral filtering algorithm. Method 500 can block partition an image, and skip some of the blocks so that unnecessary computations are avoided during the recursive linear filtering. The resultant accelerated process of method 500 is able to achieve improved processing time (e.g., 1.5-5 times speedup).

Method 500 can begin at 502 where an image is accessed or otherwise obtained. The image can be of various sizes, such as from 0.5 million pixels to 6 million pixels, although the method 500 can be applied to images having less pixels or more pixels than this described range. The image can be obtained by and the method 500 can be implemented by various devices or combinations of devices, such as a set top box, desktop computer, mobile communication device, server, and so forth. Method 500 is described with respect to an image, but it should be understood that the methodology described herein can be applied to any number of images, which can be still images or video content.

At 504, the image can be partitioned or otherwise defined into a group of blocks. In one embodiment, the blocks can be of the same size. In another embodiment, the blocks can be square blocks. The size of the blocks can vary based on a number of factors, such as the total number of pixels for the image, the desired filtering computation time, the capabilities of the device performing method 500, the desired accuracy for the filtering, and so forth. In one embodiment, each block of the group of blocks can have a size of $c_o$ by $c_o$, where $c_o$ is equal to a spatial kernel variance utilized by an infinite impulse response filter (described with respect to step 506).

At 506, PBFICs can be selectively computed for certain blocks without being computed for other blocks of the group of blocks. As an example, the group of blocks can include first blocks, first surrounding blocks that are each adjacent to one of the first blocks, second blocks, and second surrounding blocks that are each adjacent to one of the second blocks. PBFICs can be calculated for the first blocks responsive to determinations that a first pixel within each of the first blocks has a first intensity level within a pre-determined intensity range or responsive to a determination that a second pixel within the first surrounding blocks has a second intensity level within the pre-determined intensity range. Continuing with this example, method 500 can save computational resources by not calculating PBFICs for the second blocks where there is a determination that pixels within the second blocks have intensity levels outside of the pre-determined intensity range and responsive to a determination that pixels within the second surrounding blocks have intensity levels outside of the pre-determined intensity range. The exemplary method can utilize an infinite impulse response filter applied to the image using calculated principle bilateral filtered image components for selective blocks of the image.

Upon reviewing the aforementioned embodiments, it would be evident to an artisan with ordinary skill in the art that said embodiments can be modified, reduced, or enhanced without departing from the scope of the claims described below. For example, pre-filtering can be performed on the image to facilitate the selective calculation of PBFICs for selective blocks. For instance, the pre-filtering can include determining a maximum intensity and a minimum intensity for each block of the group of blocks. The pre-filtering can be performed by the same device performing the filtering or can be performed by another device. As an example, a sending device that is forwarding the image to a recipient device can perform pre-filtering of the image and can provide the results of the pre-filtering with the image (such as in metadata) to the recipient device, so that the recipient device can perform the PBFIC calculations and IIR filtering on the image. This example provides a distributed implementation of method 500 between the sending device and the recipient device which can further improve the image processing being performed by the recipient device.

In another embodiment, downsampling of the image can be performed which can further facilitate the image processing by the recipient device. In another embodiment, a GPU can be used to perform all or a portion of method 500. For example, each block of the group of blocks can have a size of $c_o$ by $c_o$, where $c_o$ is selected to be a multiple of 16 to facilitate processing by the GPU.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
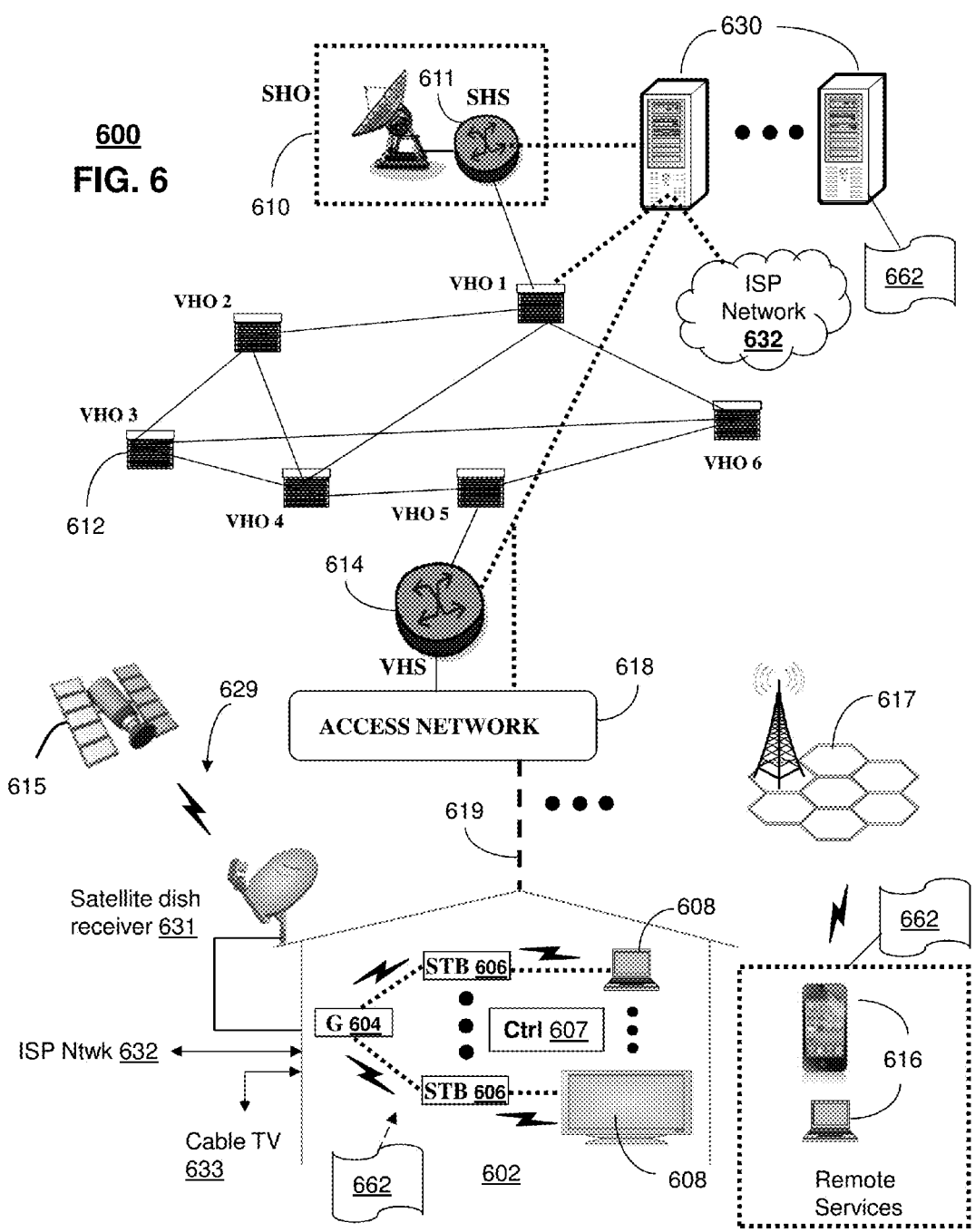
FIG. 6 depicts an illustrative embodiment of a communication system that provides media services including image filtering.

FIG. 6 depicts an illustrative embodiment of a communication system 600 for delivering media content. The communication system 600 can represent an Internet Protocol Television (IPTV) media system. Communication system 600 enables image processing that saves computational resources. For example, one or more devices in system 600 can access an image and partition the image into a group of blocks. The one or more device can then selectively calculate PBFICs for a first subset of the group of blocks, while not calculating PBFICs for a second subset of the group of blocks. Infinite impulse response filtering can be applied to the image by the one or more devices using the selectively calculated PBFICs. A selection of the first subset of the group of blocks can be based on determinations that a first pixel within each block of the first subset has a first intensity level within a pre-determined intensity range or responsive to a determination that a second pixel within a surrounding block of each block of the first subset has a second intensity level within the pre-determined intensity range. The PBFICs may not be calculated for the second subset of the group of blocks responsive to a determination that pixels within the second subset have intensity levels outside of a pre-determined intensity range and responsive to a determination that pixels within surrounding blocks of the second subset have intensity levels outside of the pre-determined intensity range. By only calculating PBFICs for certain blocks, computational resources of the one or more devices can be saved without a significant reduction in image accuracy.

The IPTV media system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as an image processing server (herein referred to as server 630). The server 630 can use computing and communication technology to perform function 662, which can include among other things, a modified version of Yang's real time filtering algorithm in which PBFICs are only calculated for certain blocks of the image based on pixel intensity values for pixels in the block or in surrounding blocks. The media processors 606 and wireless communication devices 616 can also be provisioned with software function 662 to perform image filtering such as described in method 500.

In one or more embodiments, the image filtering can be performed in a distributed manner. For example, an image can be partitioned into the group of blocks by the server 630 and the server can also perform pre-filtering on the image to identify a maximum pixel intensity and a minimum pixel intensity for each block of the group of blocks. This pre-filtering data can be provided, along with the image, from the server 630 to a recipient device such as STB 606 or mobile device 616. Based on the pre-filtering data and the image, the recipient device can perform the remaining steps of method 500 including calculating PBFICs for selective blocks of the image and performing an IIR filtering of the image based on the calculated PBFICs.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
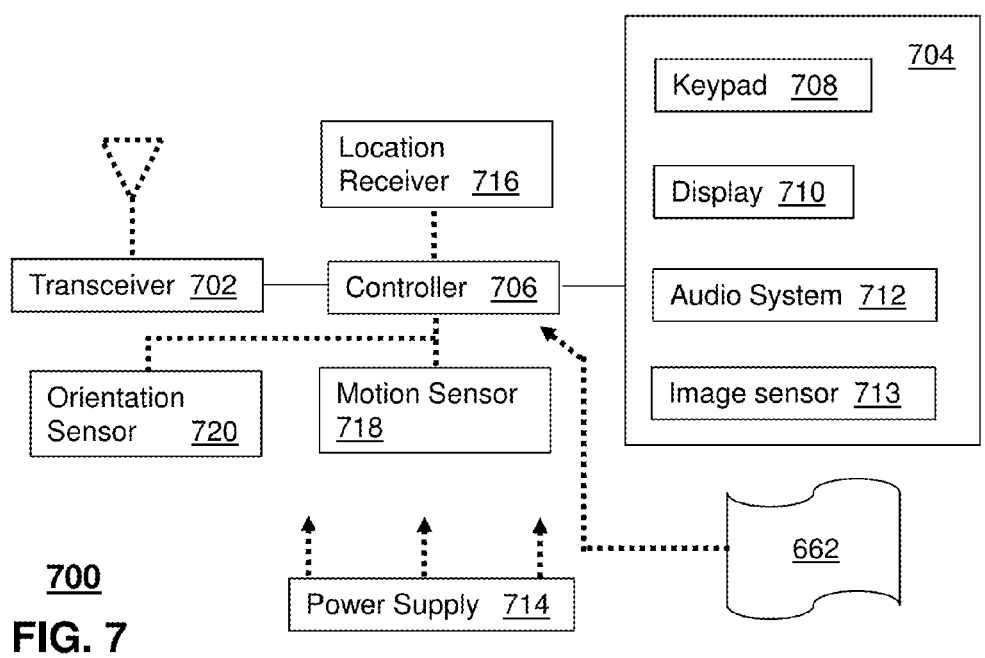
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 6, including mobile devices, set top boxes, desktop computer, tablets, servers and so forth. Device 700 can utilize bilateral filtering that is selectively applied to blocks of an image to perform image filtering, such as via an IIR filtering methodology. For example, Yang's realtime O(1) bilateral filtering algorithm can be modified to strategically eliminate some of the computations based on blocks of the images having pixels that satisfy an intensity threshold. For example, PBFICs can be selectively computed for certain blocks without being computed for other blocks of the group of blocks. In this example, the group of blocks can include first blocks, first surrounding blocks that are each adjacent to one of the first blocks, second blocks, and second surrounding blocks that are each adjacent to one of the second blocks. PBFICs can be calculated for the first blocks responsive to determinations that a first pixel within each of the first blocks has a first intensity level within a pre-determined intensity range or responsive to a determination that a second pixel within the first surrounding blocks has a second intensity level within the pre-determined intensity range. Continuing with this example, PBFICs would not be calculated for the second blocks where there is a determination that pixels within the second blocks have intensity levels outside of the pre-determined intensity range and responsive to a determination that pixels within the second surrounding blocks have intensity levels outside of the pre-determined intensity range. The pre-determined intensity range can be selected based on a number of factors including, the desired computation time, the capabilities of device 700, the desired filtering accuracy, the type of image being filtered (e.g., an image of the outdoors from a distance versus a close-up image of a person), and so forth. An infinite impulse response filter can be applied by device 700 to the image using the calculated principle bilateral filtered image components.

To enable these filtering features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 shown in FIG. 7 or portions thereof can serve as a representation of one or more of the devices of system 600 of FIG. 6. In addition, the controller 706 can be adapted in various embodiments to perform the function 662.

Figure 8:
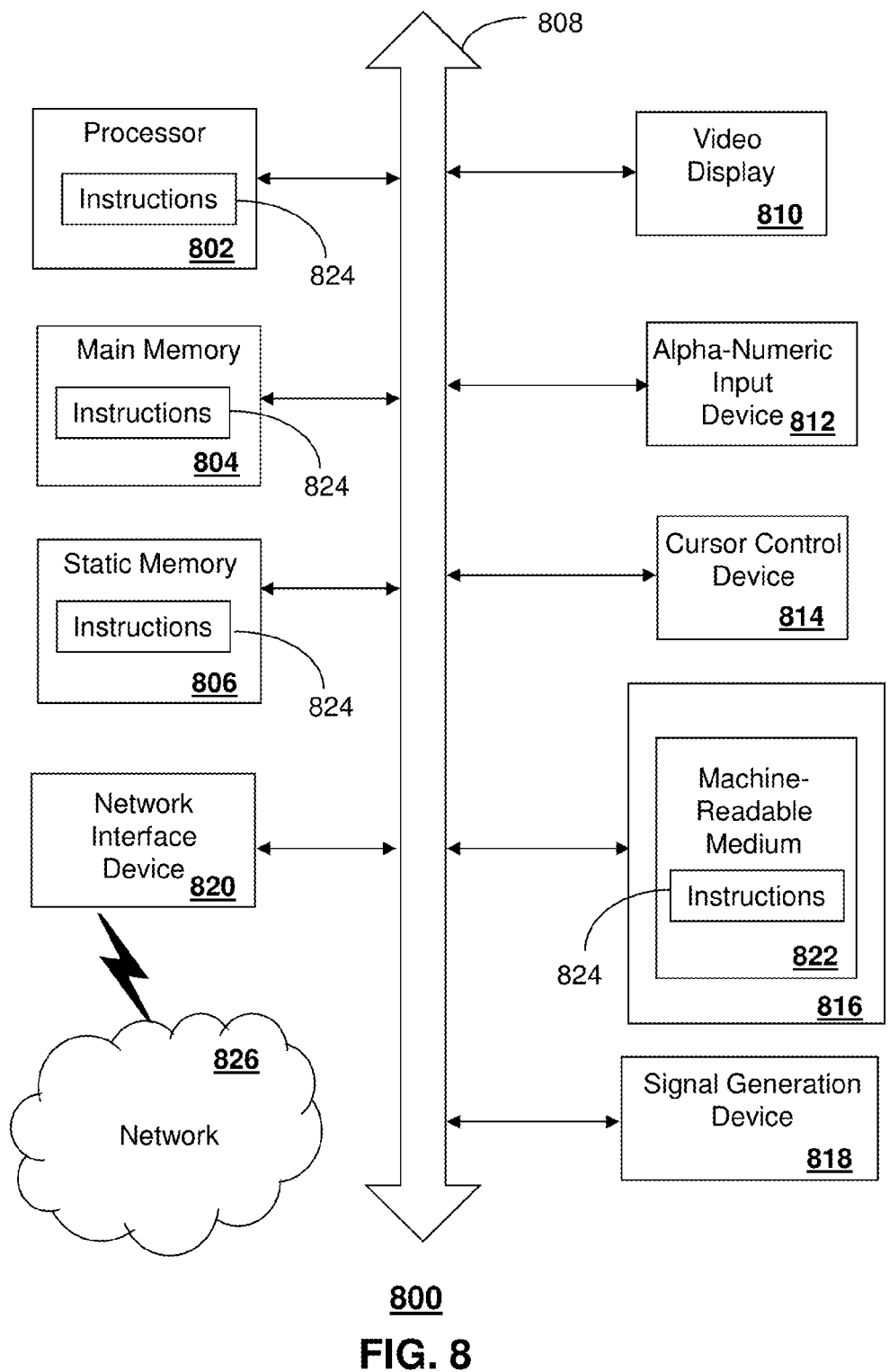
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 630, the media processor 606 or the mobile device 616 to perform image filtering utilizing PBFICs that are only selectively calculated for portions of the images (e.g., for a first set of image blocks but not for a second set of image blocks) in order to save computational resources. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
calculating, by a processor, principle bilateral filtered image components for first blocks of an image responsive to determinations that a first pixel within each of the first blocks has a first intensity level within a pre-determined intensity range or responsive to a determination that a second pixel within first surrounding blocks of the image has a second intensity level within the pre-determined intensity range, where the first surrounding blocks are each adjacent to one of the first blocks, wherein the principle bilateral filtered image components are not calculated for second blocks of the image responsive to a determination that pixels within second surrounding blocks of the image have intensity levels outside of the pre-determined intensity range, and wherein the second surrounding blocks are each adjacent to one of the second blocks; and
applying, by the processor, a filter to the image using the principle bilateral filtered image components.

2. The method of claim 1, wherein the principle bilateral filtered image components are not calculated for the second blocks responsive to a determination that pixels within the second blocks have intensity levels outside of the pre-determined intensity range.

3. The method of claim 1, comprising performing a pre-filtering technique by determining a maximum intensity and a minimum intensity for each block of a group of blocks including the first and second blocks, wherein the group of blocks are of the same size.

4. The method of claim 1, comprising downsampling the image.

5. The method of claim 1, wherein each block of the first blocks and the first surrounding blocks has a size of $c_o$ by $c_o$, wherein $c_o$ is equal to a spatial kernel variance utilized by the filter.

6. The method of claim 1, wherein the processor is a graphics processing unit, wherein each block of the first blocks has a size of $c_o$ by $c_o$, and wherein $c_o$ is a multiple of 16.

7. A computer-readable storage device comprising computer instructions which, responsive to being executed by a processor, cause the processor to perform operations comprising:
    partitioning an image into a group of blocks;
    calculating principle bilateral filtered image components for a first subset of the group of blocks, wherein a selection of the first subset of the group of blocks is based on a determination that a second pixel within a surrounding block of each block of the first subset has a second intensity level within a pre-determined intensity range, wherein the principle bilateral filtered image components are not calculated for a second subset of the group of blocks responsive to: a first determination that pixels within the second subset have intensity levels outside of the pre-determined intensity range, a second determination that pixels within surrounding blocks of the second subset have intensity levels outside of the pre-determined intensity range, or a combination thereof; and
    applying a filter to the image using the principle bilateral filtered image components.

8. The computer-readable storage device of claim 7, wherein a selection of the first subset of the group of blocks is based on determinations that a first pixel within each block of the first subset has a first intensity level within a pre-determined intensity range.

9. The computer-readable storage device of claim 7, wherein the processor comprises a plurality of processors operating in a distributed processing environment.

10. The computer-readable storage device of claim 7, wherein each block of the group of blocks has a size of $c_o$ by $c_o$, wherein $c_o$ is equal to a spatial kernel variance utilized by the filter.

11. The computer-readable storage device of claim 7, wherein the operations further comprise downsampling the image.

12. The computer-readable storage device of claim 7, wherein the filter utilizes a spatial kernel variance between 4 to 40.

13. The computer-readable storage device of claim 7, wherein the filter utilizes a range kernel variance between 0.04 to 0.3.

14. The computer-readable storage device of claim 7, wherein the processor is a graphics processing unit, wherein each block of the group of blocks has a size of $c_o$ by $c_o$, and wherein $c_o$ is a multiple of 16.

15. A device comprising:
    a memory that stores computer instructions; and
    a processor coupled with the memory, wherein the processor, responsive to executing the computer instructions, performs operations comprising:
        calculating principle bilateral filtered image components for a first subset of a group of blocks of an image, wherein a selection of the first subset of the group of blocks is based on a determination that a second pixel within a surrounding block of each block of the first subset has a second intensity level within a pre-determined intensity range, wherein the principle bilateral filtered image components are not calculated for a second subset of the group of blocks responsive to: a first determination that pixels within the second subset have intensity levels outside of the pre-determined intensity range, a second determination that pixels within surrounding blocks of the second subset have intensity levels outside of the pre-determined intensity range, or a combination thereof; and
        applying a filter to the image using the principle bilateral filtered image components.

16. The device of claim 15, wherein a selection of the first subset of the group of blocks is based on determinations that a first pixel within each block of the first subset has a first intensity level within a pre-determined intensity range.

17. The device of claim 15, wherein the processor comprises a plurality of processors operating in a distributed processing environment.

18. The device of claim 15, wherein each block of the group of blocks has a size of $c_o$ by $c_o$, wherein $c_o$ is equal to a spatial kernel variance utilized by the filter.

19. The device of claim 15, wherein the operations further comprise downsampling the image.

* * * * *